June 7, 1966            L. E. SMITH            3,254,532
TEMPERATURE-HUMIDITY INDEX MEASURING DEVICE
Filed May 1, 1961
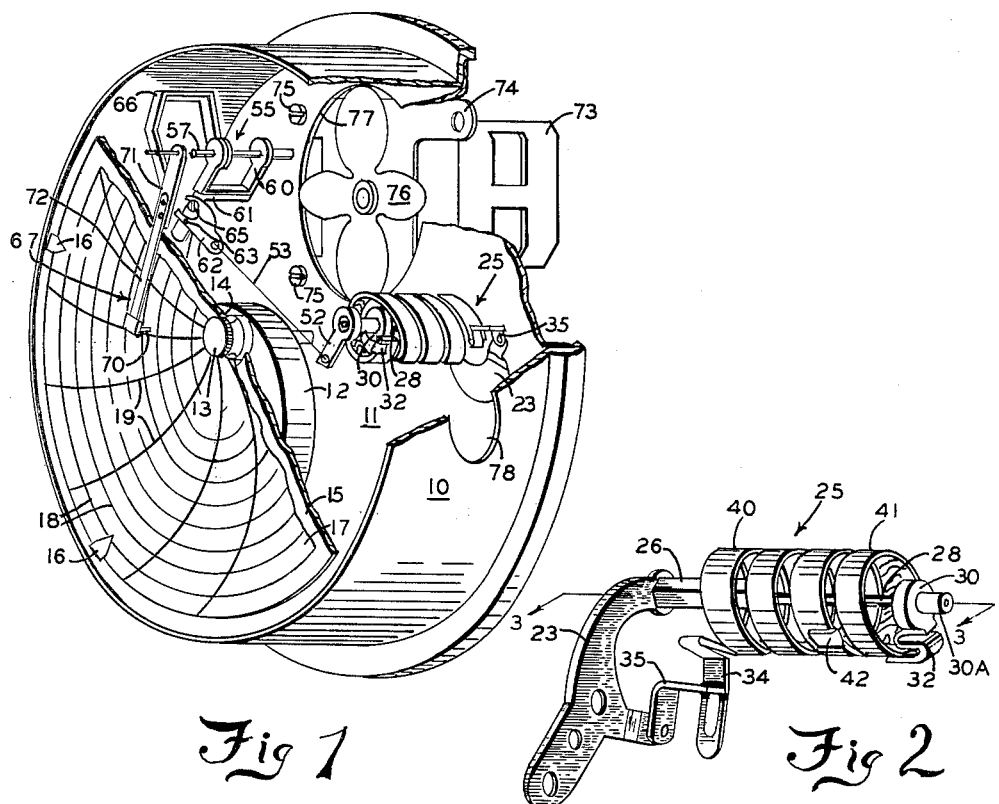
*Fig 1*
*Fig 2*
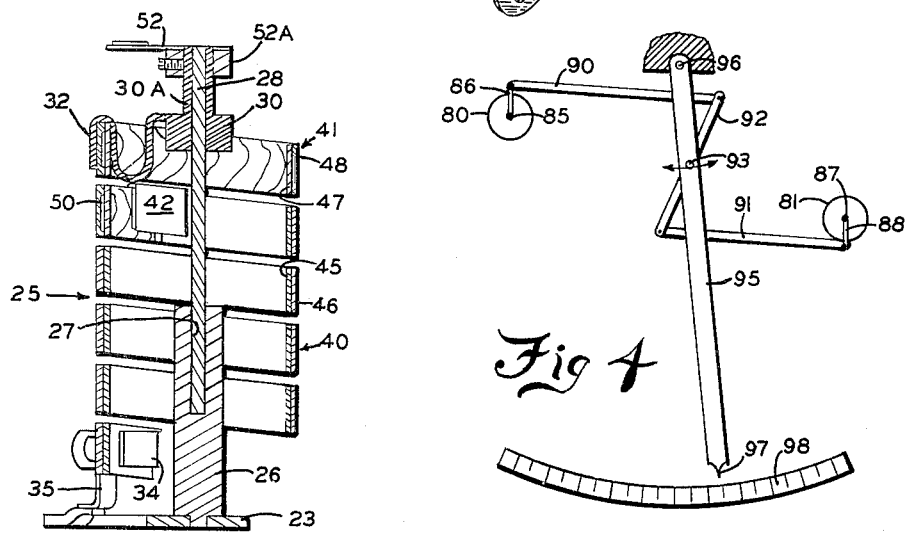
*Fig 3*
*Fig 4*

United States Patent Office 3,254,532
Patented June 7, 1966

3,254,532
TEMPERATURE-HUMIDITY INDEX MEASURING DEVICE
Lawrence Emerson Smith, Waterbury, Conn., assignor to The Bristol Company, Waterbury, Conn., a corporation of Connecticut
Filed May 1, 1961, Ser. No. 106,798
13 Claims. (Cl. 73—336)

This invention relates to measuring apparatus and more particularly to such apparatus for measuring a quantity representative of a plurality of characteristics of a given atmosphere.

Measuring apparatus of the type to which the present invention is directed, while of general application, are particularly advantageous in the measurement of a quantity representing a combination of ambient temperature and atmospheric humidity. As an illustration, in recent years there has come into frequent usage a single physical quantity known as the Comfort, or Temperature-Humidity, Index. This index comprises an empirical combination of dry-bulb temperature and percent relative humidity and provides an indication of the psychological feeling of comfort or discomfort under varying atmospheric conditions.

Heretofore, difficulties have been encountered in providing apparatus suitable for measuring a quantity representative of a plurality of characteristics of a given atmosphere, and these difficulties have been of special moment in the direct measurement of a quantity representing a combination of ambient temperature and humidity. The complicated and often expensive measuring devices previously employed for this purpose have not been readily adaptable for widespread usage with the desired degree of accuracy and reliability.

One general object of this invention, therefore, is to provide a new and improved apparatus for measuring a quantity representative of a plurality of characteristics of a given atmosphere.

More specifically, it is an object of this invention to provide such apparatus for the direct measurement of a quantity representing a combination of ambient temperature and atmospheric humidity.

Another object of this invention is to provide an apparatus of the character indicated which is especially well suited for measurement of the Temperature-Humidity Index.

Still another object of this invention is to provide a measuring apparatus utilizing comparatively simple mechanical elements, which apparatus is economical to manufacture and thoroughly reliable in operation.

In one illustrative embodiment of this invention, there is provided, in an apparatus for simultaneously measuring a plurality of characteristics of a given atmosphere, a transducer element having a first portion responsive to one of the characteristics and a second portion responsive to the other characteristic. An indicator device is connected to the transducer element by linkage means of particular construction and arrangement, so as to provide an indication of a single quantity representative of the two characteristics being measured.

In accordance with one feature of the invention, the first portion of the transducer element is movable in response to changes in the one characteristic of the atmosphere, while the second transducer portion is movable in response to changes in the other characteristic. The net deflection of the transducer element is transmitted by the linkage means to the indicator device and provides an indication of a single physical quantity representative of the measured characteristics.

In accordance with another feature of the invention, in certain particularly advantageous embodiments, the transducer element is in the form of a single, continuous helix with the two portions thereof connected in series. One end of the helix is fixed, while the other end moves in response to the changes in the characteristics being measured. This movement is transmitted to the indicator device to provide an accurate and well-defined indication of the quantity representing the measured characteristics.

In accordance with a further feature of this invention, in certain good embodiments, the first portion of the transducer element comprises a helical bimetallic strip which is responsive to ambient temperature, whereas the second transducer portion is in the form of a helical hygrometer responsive to percent relative humidity. The arrangement is such that the movement of the indicator device is proportional to the net change in ambient temperature and percent relative humidity. In addition, the device is calibrated so as to provide a direct indication of the Temperature-Humidity Index corresponding to the particular temperature and humidity being measured.

The present invention as well as further objects and features thereof will be understood more clearly and fully from the following detailed description of certain preferred embodiments, when read in conjunction with the accompanying drawings, in which:

FIGURE 1 is an isometric view, partially broken away to show internal structure, of a measuring apparatus constructed in accordance with one illustrative embodiment of the invention;

FIGURE 2 is an isometric view of a portion of the apparatus shown in FIGURE 1;

FIGURE 3 is a sectional view taken along the line 3—3 in FIGURE 2; and

FIGURE 4 is a diagrammatic view of a measuring apparatus constructed in accordance with another illustrative embodiment of the invention.

Referring initially to FIGURE 1 of the drawings, there is shown a measuring apparatus which is partially enclosed by a cylindrical housing 10 mounted on a base plate 11. A clock motor 12 is supported within the housing 10 and includes an axially disposed, rotatable hub 13 on the side thereof opposite that adjacent the plate 11. This hub extends through an axial aperture 14 in a circular plate 15 which is suitably maintained in spaced, parallel relationship with the plate 11, as by brackets 16. The plate 15 supports a rotatable chart 17 affixed adjacent the outer end of the hub 13. The chart 17 is of conventional configuration and is provided with the usual concentric lines 18 representative of the Temperature-Humidity Index and the curved, substantially radial lines 19 which represent time.

Supported on a plate 23 mounted on the base plate 11 is an elongated transducer element 25. The element 25 is in the form of a continuous helix which is oriented within the housing 10 intermediate the housing axis and its periphery. The axis of element 25 extends in a direction perpendicular to the plane of the chart 17.

As best shown in FIGURES 2 and 3, an upstanding pillar 26 is rigidly secured at one end to the plate 23 and is axially disposed within the helical element 25. The free end of the pillar 26 is provided with a centrally located bore 27 which fixedly accommodates a center post 28. The center post extends beyond the upper end of the element 25, as viewed in FIGURE 3, and is provided with a hub member 30 journaled for rotation thereon. The member 30 includes an upwardly extending sleeve extension 30A and is suitably connected to the upper end of element 25 by a clamp bracket 32 (FIGURE 2). The opposite, lower end of the element 25 is held stationary by a bracket 34 which is soldered or otherwise fixed to one leg of an L-shaped member 35. The other leg of member 35 is rigidly secured to the plate 23.

The transducer element 25 comprises a helical temperature sensitive portion 40 and a helical hygrometer portion 41 which are connected in series relationship with each other by a junction clamp 42. The temperature portion 40 is secured at the end thereof opposite the clamp 42 to the bracket 34, thereby holding this end fixed. The portion 40 is fabricated from two metallic pieces 45 and 46 which are of materials having different temperature coefficients of linear expansion and are welded or otherwise secured together to form a bimetallic strip. With this arrangement, the dimensions of the portion 40 change substantially linearly with changes in dry-bulb temperature, and the resulting deflection of the end of portion 40 adjacent the clamp 42 likewise is proportional to these temperature changes.

The helical hygrometer portion 41 of the transducer element 25 is series-connected at one end to the temperature portion 40 by the clamp 42 and at the other end to the bracket 32 affixed to the member 30 on the center post 28. The hygrometer portion 41 is of laminar construction and includes a hygroscopic strip 47 and a backing strip 48. The strip 47 is made from a fibrous, organic material which expands and contracts as a function of percent relative humidity. In the embodiments of the invention illustrated in the drawings, the strip 47 is fabricated from wood which has been cut so as to provide optimum grain orientation for maximum linear expansion and contraction in response to given changes in percent relative humidity. The backing strip 48 is cemented or otherwise secured to the external surface of the humidity sensitive strip 47. The strip 48 advantageously is manufactured from a material which is impervious to moisture, such as a plastic, for example, for purposes that will become more fully apparent hereafter. A helical spring frame member 50 is sealed between the strip 48 and the strip 47.

As best shown in FIGURES 1 and 3, a transverse arm 52 is rigidly affixed to the sleeve extension 30A of the member 30, as by a hub member 52A. This arm is connected by means of a wire link 53 to an indicator mechanism indicated generally at 55. The mechanism 55 is pivotally supported on an upstanding post 57 which extends between the chart plate 15 and the base plate 11 and is suitably affixed to this latter plate. Mounted for pivotal movement on the post 57 are the legs of a substantially U-shaped member 60. The bight of the member 60 is maintained in fixed relationship with the adjacent end of the wire link 53 by an L-shaped bracket 61 and a hinged tab 62 which is pivotally secured thereto, as at 63. A set screw 65 mounted on bracket 61 serves to normally hold the bracket 61 and the tab 62 in fixed relationship with each other but permits relative angular movement therebetween, for purposes that will become more fully apparent hereafter.

One leg of a second U-shaped member 66 is rigidly secured to the leg of the member 60 adjacent the inner surface of the plate 15. The other leg of the member 66 is disposed in juxtaposition with the chart 17 on the opposite, outer surface of plate 15 and is affixed to one end of an elongated arm 67. The arm 67 extends in a direction transverse to the axis of the upstanding post 57 and is provided at its other end with a recording pen 70 in engagement with the chart. To permit adjustment of the position of the pen 70 relative to the post 57, the arm 67 comprises two elongated members 71 and 72 which are suitably maintained in fixed but adjustable relationship with each other.

An electric fan 73 is supported on a mounting plate 74 which is affixed to the base plate 11 on the side thereof opposite that of the element 25, as by bolts 75. The fan 73 includes four blades 76 which are positioned adjacent an enlarged opening 77 in the base plate. The fan blades are pitched so as to draw air from suitable apertures in the cylindrical housing 10, such as the aperture 78, across the element 25, through the opening 77 and over the fan 73, to thereby circulate the air through the housing and carry away any undesired heat from the fan.

The changes in dry-bulb temperature and percent relative humidity of the air passing over the helical transducer element 25 cause corresponding changes in the angular position of the upper end of the element 25, as viewed in FIGURE 3, relative to the axis of the center post 28. Thus, upon changes in temperature, the dimensions of the bimetallic portion 40 of the transducer element change proportionately to vary the angular position of the end of the portion 40 adjacent the clamp 42. The movement of this end of portion 40 is transmitted by the clamp to the hygrometer portion 41 and appears as a corresponding change in the angular position of the upper end of the hygrometer portion.

The dimensions of the hygrometer portion 41 change in accordance with changes in percent relative humidity. As the relative humidity increases, for example, the hygroscopic strip 47 expands to produce a corresponding variation in the angular position of the upper end of the portion 41. As indicated in the drawings, the strip 47 is provided with a backing strip 48 of plastic or other material impervious to moisture. The resulting difference in the moisture coefficients of expansion of these strips accentuates the variations in the angular position of the upper end of portion 41 in a manner analogous to the action of the bimetallic temperature portion 40. As a result, the sensitivity of the apparatus to changes in percent relative humidity is enhanced.

The clamp 42 effectively maintains the helical temperature portion 40 and the helical hygrometer portion 41 in series relationship with each other. The transducer element 25 responds jointly and additively to changes in atmospheric temperature and humidity to produce a net change in the angular position of the end thereof affixed to the clamp bracket 32, and hence a net change in the angular position of the clamp member 30. This change is transmitted by means of the arm 52, the wire link 53 (FIGURE 1), the hinged tab 62 and the L-shaped bracket 61 to the U-shaped member 60, thereby pivoting the member 60 about the upstanding post 57. As the member 60 rotates, the pen arm 67 is rotated by the U-shaped member 66 to produce a corresponding change in the position of the recording pen 70. The arrangement is such that the position of the pen 70 on the chart 17 at all times conforms to a combined quantity representative of ambient temperature and percent relative humidity. As the chart 17 rotates under the control of the clock motor 12, the pen plots this quantity with respect to time to form a continuous graphical record for any given period.

In many advantageous embodiments, the apparatus is calibrated so as to provide direct readings on the chart 17 of the Temperature-Humidity Index. This Index, as empirically defined by the United States Weather Bureau, comprises a combination of dry-bulb and wet-bulb temperature, and hence dry-bulb temperature and percent relative humidity, in the following relationship:

$$\text{T.-H.I.} = 0.4(T_d + T_w) + 15$$

where

T.-H.I.=Temperature-Humidity Index
$T_d$=dry-bulb temperature in ° F.
$T_w$=wet-bulb temperature in ° F.

It has been found from calculations and experimentation based on this relationship that, within the ranges of conditions of ordinary human comfort, the Temperature-Humidity Index may be expressed in terms of dry-bulb temperature and percent relative humidity as follows:

$$\text{T.-H.I.} = 10.6 + .7[T_d + 0.2(\text{percent RH})]$$

Accordingly, in embodiments in which the chart 17 is to be read directly in terms of the Temperature-Humidity Index, the transducer element 25 advantageously is constructed and proportioned so that the ratio between the sensitivity of the temperature portion 40 and that of the humidity portion 41 is 5 to 1. With this arrangement, the apparatus provides an accurate and well-defined indication on the chart 17 of the Temperature-Humidity Index corresponding to the prevailing ambient temperature and percent relative humidity.

In cases in which it is necessary or desirable to orient the recording pen 70 with respect to a predetermined reference position on the chart 17, the indicating mechanism 55 is adjusted by means of the set screw 65 to change the position of the hinged tab 62 relative to the bracket 61 and the member 60, thereby varying the linkage ratio between member 60 and the wire link 53. In addition, or alternatively, the apparatus may be adjusted by varying the angular connection between the pen arm 67 and the U-shaped member 66 and/or by adjusting the effective length of the pen arm by moving the portions 71 and 72 thereof relative to one another.

Referring now to FIGURE 4 of the drawings, there is shown a measuring apparatus which is representative of another illustrative embodiment of the invention. The apparatus comprises a helical bimetallic transducer 80 which is responsive to changes in ambient temperature and a helical hygroscopic transducer 81 responsive to changes in percent relative humidity. The particular construction and mode of operation of the transducers 80 and 81 are in general similar to the construction and operation of the portions 40 and 41, respectively, of the transducer element 25 described heretofore. Contrary to the transducer portions 40 and 41, however, the transducers 80 and 81 are spaced apart from one another on parallel axes.

One end of the temperature sensitive transducer 80 is held stationary, while the other end is suitably connected to a transversely extending arm 86 rotatably mounted on a center post 85. Similarly, one end of the humidity sensitive transduecr 81 is fixed, while the other end is connected to a transversely extending arm 88 mounted on a center post 87. The directon of the helical winding comprising the transducer 80 is opposite to that of the helical winding comprising the transducer 81, that is, one transducer is wound clockwise, while the other is wound counterclockwise. In addition, the transversely extending arms 86 and 88 extend in opposite directions from their corresponding center posts, the arm 86 extending in an upward direction, as viewed in FIGURE 4, and the arm 88 extending downwardly, as viewed in this figure. With this arrangement, one of these arms rotates in a clockwise direction as the temperature or humidity variable to which it is responsive increases, while the other arm moves in a counterclockwise direction in response to increasing values of its variable.

One end of an elongated link 90 is pivotally connected to the outer end of the arm 86 for the transducer 80. Similarly, one end of an elongated link 91 is pivotally secured to the outer end of the arm 88 for transducer 81. The opposite ends of the links 90 and 91 are pivotally affixed to respective ends of an interconnecting arm 92 which is supported for rotary movement at its midpoint about a floating pivot pin 93. The pin 93 is carried intermediate the ends of an indicator arm 95. One end of this arm is pivotally movable about a stationary axis, as at 96, while the other end is provided with a pointer 97 which is in juxtaposition with a scale 98 calibrated in accordance with the Temperature-Humidity Index.

The transverse arms 86 and 88 rotate about their center posts 85 and 87 in response to changes in ambient temperature and percent relative humidity, respectively. Upon movement of either or both of these arms, the indicator 95 pivots about the point 96 in accordance with the algebraic sum of the arm displacements. For example, in cases in which the arms 86 and 88 move their corresponding links 90 and 91 longitudinally in the same direction, in response to an increase or decrease in both ambient temperature and percent relative humidity, the pin 93 likewise is urged in this direction to pivot the indicator arm 95 about the point 96, thereby moving the pointer 97 in accordance with the sum of the arm displacements. Upon longitudinal movement of the links 90 and 91 in opposite directions, as would occur in response to an increase in ambient temperature and a decrease in percent relative humidity, for example, the pin 93 moves in accordance with the difference in the displacements of the arms 86 and 88 to similarly move the indicator 95 and the pointer 97. The scale 98 is calibrated to read directly in terms of the Temperature-Humidity Index, and the ratio between the sensitivities of the temperature transducer 80 and the humidity transducer 81 is in accordance with that described heretofore for the portions 40 and 41 (FIGURE 3) of the transducer 25. For each position of the pointer 97, the Temperature-Humidity Index corresponding to ambient temperature and percent relative humidity is quickly and easily ascertained.

As indicated heretofore, in the illustrated embodiments of the invention, the temperature sensitive elements 40 and 80 advantageously are of bimetallic construction. In other good arrangements, these elements may each comprise a helical, fluid-filled Bourdon spring which, when operatively connected in a conventional fluid-filled, temperature-sensitive bulb system, is likewise responsive to ambient temperature. The Bourdon system is likewise suitably connected in series with the corresponding hygrometer element 41 or 81.

The terms and expressions which have been employed are used as terms of description and not of limitation, and there is no intention in the use of such terms and expressions, of excluding any equivalents of the features shown and described, or portions thereof, it being recognized that various modifications are possible within the scope of the invention claimed.

What is claimed is:

1. In a measuring instrument, a helical transducer element comprising a first helix responsive to one characteristic of a given atmosphere and a second helix responsive to another characteristic of said atmosphere, means for connecting said helices in series, to form a single continuous helix, and means operatively associated with said transducer element for indicating a single, combined quantity representative of both of the characteristics of said atmosphere.

2. In a measuring instrument, a helical transducer element comprising a first helical portion responsive to ambient temperature and a second helical portion responsive to atmospheric humidity, means for connecting said portions in series, to form a single continuous helix, and means connected to said transducer element for indicating a single, combined quantity representative of the algebraic sum of said temperature and said humidity.

3. In a measuring instrument, a helical transducer element comprising a first helical portion responsive to ambient temperature and a second helical portion responsive to percent relative humidity, the ratio of the sensitivity of said first helical portion to that of said second helical portion being 5 to 1, means for connecting said first and second helical portions in series, and means operatively associated with said transducer element for indicating a single, combined quantity representative of the Temperature-Humidity Index corresponding to said temperature and said humidity.

4. In a measuring instrument, a helical transducer element comprising a helical bimetallic portion subject to dimensional changes in response to changes in ambient temperature and a helical hygrometer portion subject to dimensional changes in response to changes in percent relative humidity, the ratio of the sensitivity of said bimetallic portion to that of said hygrometer portion being 5 to 1, clamp means for connecting said helical portions in series, to form a single continuous helix and means connected to one of said helical portions for indicating a single, combined quantity representative of the Temperature-Humidity Index corresponding to said temperature and said humidity.

5. In a measuring instrument as defined in claim 4, said helical hygrometer portion comprising a first lamination of hygroscopic material and a second lamination of a material substantially impervious to moisture.

6. Apparatus for measuring a quantity representative of a plurality of characteristics of a given atmosphere, comprising, in combination, a helical transducer element including a first helical portion responsive to one characteristic of said atmosphere, a second helical portion responsive to another characteristic of said atmosphere and means for connecting said helical portions in series, to form a single continuous helix, an indicator device, and linkage means connecting said indicator device with said transducer element, so as to produce a combined indication representative of both of the characteristics of said atmosphere.

7. Apparatus for measuring a quantity representative of a plurality of characteristics of a given atmosphere, comprising, in combination, a first substantially cylindrical helical element responsive to ambient temperature, a second, substantially cylindrical helical element operatively associated with said first element and responsive to percent relative humidity, means for connecting said helical elements in series about a common axis, to form a single, continuous helix, an indicator device, and linkage means, connecting said indicator device with at least one of said helical elements, so as to produce single combined indication representative of the sum of the ambient temperature and percent relative humidity.

8. Apparatus for measuring a quantity representative of a plurality of characteristics of a given atmosphere, comprising, in combination, a helical transducer element including a helical bimetallic portion subject to dimensional changes in response to changes in ambient temperature and a helical hygrometer portion subject to dimensional changes in response to changes in percent relative humidity, each of said portions being of substantially cylindrical configuration, the ratio of the sensitivity of said bimetallic portion to that of said hygrometer portion being 5 to 1, an indicator device, and linkage means connecting said indicator device with said transducer element, so as to produce a combined indication representative of the Temperature-Humidity Index corresponding to ambient temperature and percent relative humidity.

9. Apparatus for measuring a quantity representative of a plurality of characteristics of a given atmosphere, comprising, in combination, a first transducer element responsive to changes in ambient temperature, a second transducer element responsive to changes in percent relative humidity, the ratio of the sensitivity of said first element to that of said second element being 5 to 1, means for connecting said transducer elements in series, an indicator device, and linkage means connecting said indicator device with one of said transducer elements, so as to produce a combined indication representative of the Temperature-Humidity Index corresponding to ambient temperature and percent relative humidity.

10. Apparatus for measuring a quantity representative of a plurality of characteristics of a given atomsphere, comprising, in combination, a first transducer element including a bimetallic strip movable in response to changes in ambient temperature, a second transducer element including a laminated portion movable in response to changes in atmospheric humidity, said laminated portion including a first lamination of hygroscopic material and a second lamination of a materal substantially impervious to moisture, means for connnecting said transducer elements in series to form a single continuous helix, to thereby transmit the movement of said first element to said second element, and means connected to said second element and responsive to the movement thereof and to the movement transmitted thereto from said first element for indicating a combined quantity representative of the sum of said temperature and said humidity.

11. Apparatus for measuring a quantity representative of a plurality of characteristics of a given atmosphere, comprising, in combination, a first transducer element including a bimetallic strip deflectable in response to changes in ambient temperature, a second transducer element including a laminated portion deflectable in response to changes in relative humidity, the ratio of the sensitivity of said first element to that of said second element being 5 to 1, said laminated portion including a first lamination of hygroscopic material and a second lamination of a material substantially impervious to moisture, means for connecting said transducer elements in series, to form a single continuous helix, to thereby transmit the deflections of said first element to said second element, and means connected to said second element and responsive to the deflections thereof and to the deflections transmitted thereto from said first element for indicating a combined quantity representative of the Temperature-Humidity Index corresponding to said ambient temperature and relative humidity.

12. An instrument for measuring a quantity representative of the Temperature-Humidity Index comprising, in combination, a first helix subject to dimensional changes in response to changes in ambient temperature, a second helix subject to dimensional changes in response to changes in percent relative humidity, the ratio of the sensitivity of said first helix to that of said second helix being 5 to 1, means for connecting said helices in coaxial series relationship with each other, to form a single continuous helix, and means connected adjacent one end of said continuous helix for indicating only a single combined quantity representative of the sum of the dimensional changes of said first and second helices and corresponding to the prevailing Temperature-Humidity Index.

13. An instrument for measuring a quantity representative of the Temperature-Humidity Index comprising, in combination, a first helix including a bimetallic strip subject to dimensional changes in response to changes in ambient temperature, a second helix including a hygroscopic portion subject to dimensional changes in response to changes in percent relative humidity, the ratio of the sensitivity of said first helix to that of said second helix being 5 to 1, means for connecting said helices in coaxial series relationship with each other, to form a single continuous helix, and means connected adjacent one end of said continuous helix for indicating only a single combined quantity representative of the sum of the dimensional changes of said first and second helices, said last-mentioned means including a rotatable chart and a recording pen cooperating with said chart for providing an indication of the prevailing Temperature-Humidity Index.

References Cited by the Examiner

UNITED STATES PATENTS

| | | | |
|---|---|---|---|
| 1,834,987 | 12/1931 | Van Eyk et al. | 73—336 |
| 2,193,519 | 3/1940 | Parsons | 73—338 |
| 2,294,540 | 9/1942 | Edwards | 73—338.3 |
| 2,343,878 | 3/1944 | Allen et al. | 73—338.3 |
| 2,874,571 | 2/1959 | Hevener | 73—336 |
| 2,931,226 | 4/1960 | Sadow | 73—336 |
| 3,095,742 | 7/1963 | Pelishek | 73—336 |
| 3,124,002 | 3/1964 | Pierson et al. | 73—336 |

LOUIS R. PRINCE, *Primary Examiner.*

ISAAC LISANN, *Examiner.*

C. T. WOOD, J. RENJILIAN, *Assistant Examiners.*